May 14, 1957 H. H. MUNSEY Re. 24,313

GUN SIGHT

Original Filed Sept. 1, 1949

INVENTOR
Herbert H. Munsey
BY
Bean, Brooks, Buckley & Bean
ATTORNEYS

United States Patent Office

Re. 24,313
Reissued May 14, 1957

24,313

GUN SIGHT

Herbert H. Munsey, Kenmore, N. Y.

Original No. 2,706,335, dated April 19, 1955, Serial No. 113,656, September 1, 1949. Application for reissue July 16, 1956, Serial No. 598,493

7 Claims. (Cl. 33—47)

Matter enclosed in heavy brackets [ ] appears in the original patent but forms no part of this reissue specification; matter printed in italics indicates the additions made by reissue.

My invention relates to improvements in gun sighting devices such as sights for firearms and the like.

Heretofore firearm front sights for example have been most commonly of the metal bead or bar types; the sectional diameter of the bead or bar having been varied in accord with different barrel lengths and needs for obtaining maximum visibility for aiming, and in accordance with improvements in rear or receiver sights. Although it has been the constant concern and objective of gun designers and users, to develop smaller size beads that may still be readily seen over or through the rear sight, very little in the way of improvements over the original "iron bead" type sights have actually been attained prior to the present invention. Prior art efforts in this direction have resulted in improvements such as the gold and ivory tipped beads. Even light reflectors have been devised for use in conjunction with sight beads in an effort to render them more readily visible. It is of course well known that in order to obtain maximum accuracy of aim it is necessary to have a front sight bead as small in diameter as possible, but the bead must be large enough to be effectively visible through the rear sight even under adverse light conditions. Hence, despite the aforesaid improvements, it has seldom been practicable heretofore to make such beads smaller than 3/32 of an inch in diameter due to the inability of the gunner to readily "pick up" smaller size prior type front sight beads from target background when viewed through the rear or receiver sight.

Therefore, a primary object of the present invention is to provide an improved front sight device of the bead or bar type which for any given size is more readily distinguishable from the field of vision background than any presently known bead, and which practicably may be formed of substantially smaller sectional size.

Another object of my invention is to provide an improved gun sight bead which is of improved visibility and adapted to quicker as well as finer sighting.

A further object of my invention is to provide a new front sight bead which may be readily adapted to virtually all types of present front sight holders with minimum effort.

Another object of my invention is to provide an improved sight bead formed of novel material so arranged as to be illuminated in a novel manner and likewise be protected against damage and/or deformation by external forces and/or temperature changes and the like.

Further objects and advantages of my invention will be readily apparent from the following specification.

My invention broadly contemplates a sight bead formed of material which inherently is responsive to light and which has internally thereof a light carrying and focusing characteristic, which when uniquely focused results in projecting accumulated light onto a focal plane portion thereof in a manner causing said portion to appear as an intensely brilliant surface even under minimum lighting conditions. Such material may be plastic of the acrylic type such as methyl-methacrylate with a luminous dye added, or of the luminescent nylon type; said material being so shaped and mounted as to provide a sight bead of improved brilliancy and smaller size than heretofore practicable, thereby permitting the gunner to draw a finer bead on his target with less effort and with greatly increased speed than possible with present day sights. Thus, normal rate aiming even under adverse light conditions may be accomplished with less strain on the gunner, and "snap" shooting of greatly improved accuracy is obtainable.

Plastics of the acrylic type in particular are characterized by being able to "pipe" light, and thus when a rod of such material is viewed from one end it appears to be illuminated by light transmitted through the rod from the other end and the sides thereof. The addition of certain vivid luminescent dyes well known in the "plastic" art heightens the brilliancy of and contrastability of the illumination effect; and it is a further notable characteristic of the phenomenon that the brilliance at the viewed end of the luminescent plastic piece is sharply defined by the outer limits of the plastic form, thus giving a sharply defined area of intense colored light without blurring at the edges thereof, which further assists in obtaining accurate, quick aim.

Thus, a sight bead formed of a material having the aforesaid characteristics when suitably shaped for illumination, may be made smaller in size and yet be brighter and more easily viewed in contrast to background objects or the target than any other previously used sight bead. In order to maintain its dimension and position this plastic bead must include protective means against physical damage and/or deformations due to temperature changes to avoid inaccuracy of aim due to physical disruption of the bead. Thus, the invention further contemplates an improved provision for gathering and introducing light into the sight bead member while at the same time protecting the latter against physical damage.

Figure 1:
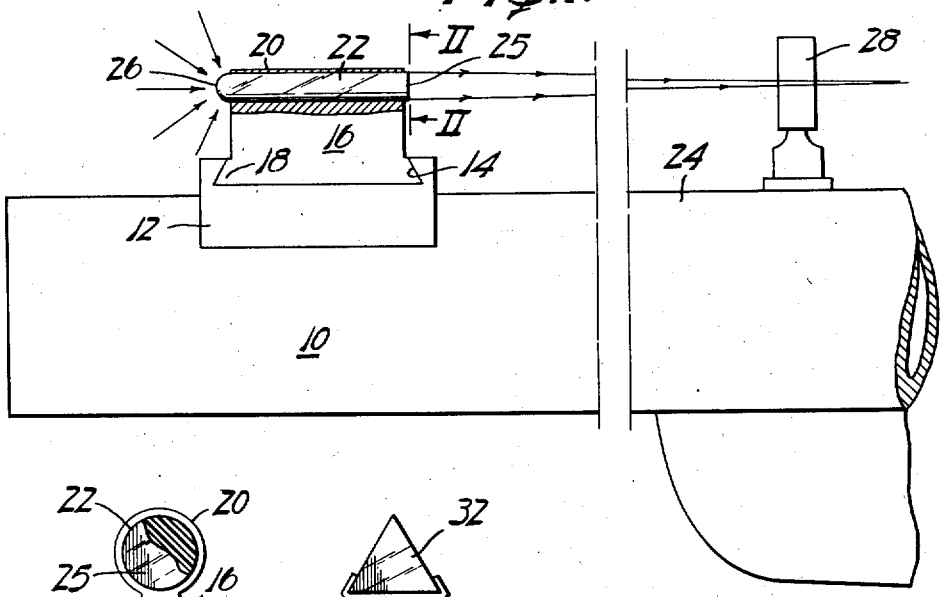
Fig. 1 is a fragmentary side elevation of a gun barrel mounting a front sight of the invention.
Figure 2:
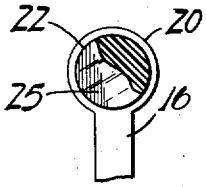
Fig. 2 is a fragmentary section, on an enlarged scale, taken along line II—II of Fig. 1.

As illustrated in the drawing in Figs. 1–2, the invention may be embodied in a front bead type gun sight which is shown as being mounted upon the front end of a gun barrel 10 by means of a conventional sight base 12 formed with a transverse dove tail slide 14. The sight body portion 16 may of course be of any desired sectional form and is shown as being provided with a dove tail base portion 18 for slipfitted mounting within the slide portion 14 of the base 12. However, it will be appreciated that the sight may be of any other form such as of the "blade" or "insert" type. The sight body portion 16 is illustrated as including along its upper edge a cylindrical section 20 which is bored to receive in pressfitted relation therein a bar of luminescent plastic designated 22 of somewhat longer dimension than said cylindrical section; the parts being arranged so that the longitudinal axis of the plastic bar is disposed substantially parallel to the gun bore. Thus, the gunner sees only the rear end or "bead" portion 25 of the plastic bar through the rear sight; the metal shell portion 20 of the sight body acting to protect the plastic device against physical blows and/or temperature change deformation while permitting the plastic device to extend therefrom at its front and rear ends.

The front end portion 26 of the plastic bar is preferably of convex or rounded form so as to function as a light gathering lens element for bringing into the plastic bar 22 as much light as possible from externally thereof. On the other hand, the rear end portion 25 of the sight bead is substantially flat, but preferably slightly concave so as to function as a projection or focal plane surface upon which the light which is "piped" through the plastic bar is focused for viewing through the rear sight device, as is indicated at 28. Thus, it will be appreciated that under all light conditions the front sight bead will operate to gather and focus an accumulation of light of brilliant hue into view through the rear sight; and that therefore the front sight bead may be constructed of smaller profile size than heretofore so that the user may quickly draw a finer bead upon the target. Whereas the construction of Figs. 1–2 may comprise an original fabrication in the form shown, it will of course be understood that a similar device might be constructed by simply drilling the bead portion of a conventional small sectional size iron sight so as to thereby provide the necessary socket for insertion of the plastic bead member.

Figure 3:
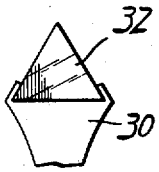
Fig. 3 is a view similar to Fig. 2 of another form of the sight device of the invention.

Fig. 3 illustrates the rear view of another form of front sight bead of the invention, wherein the body portion 30 of the sight piece is illustrated as mounting a triangularly sectioned luminescent plastic bead bar 32. Thus, the apex edge portion of the bead bar provides an extremely fine point type bead to be lined up with the target; the broader base portion of the bead 32 functioning to direct the eyesight toward the sighting apex edge thereof. The elements 30, 32 may be formed to be coextensive in length; or either one may be longer than the other, as preferred. Whereas, in Fig. 3 the sight bead 32 is illustrated as being formed separately from the sight body 30, the sight body and bead portions 30—32 may be integrally formed from a single piece of luminescent plastic material which will be preferably coated at all sides thereof except for a "window" portion such as is illustrated at 32 with some opaque dull black paint or the like so as to provide a reduced size brilliant sighting area.

Figure 4:
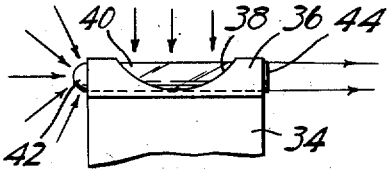
Fig. 4 is a view similar to Fig. 1 of still another form of the sight device.

Fig. 4 illustrates in side elevation a modification of the form of front sight illustrated by Figs. 1–2; in Fig. 4 the sight body 34 being surmounted by a bored shell portion 36 which corresponds to the shell portion 20 of Figs. 1–2. However, in the case of Fig. 4, the shell portion 36 is cut away as indicated at 38 so as to provide a window through which additional light from externally of the device may gain access to a substantial portion of the top and sides of the luminescent plastic bead member 40. Also, as in the case of Figs. 1–2, the front end portion of the bead 40 is preferably convex shaped as indicated at 42 and extends beyond the protective shell 36, while the rear end portion 44 of the bed is substantially flat or preferably slightly concave so as to be readily viewable through the rear sight of the gun as explained hereinabove. Thus, it will be appreciated that the construction of Fig. 4 provides an additional degree of illumination of the bead member while substantially retaining the protective features provided by means of the metal shell enclosing the plastic bead.

Figure 5:
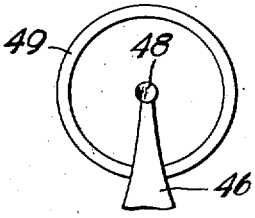
Fig. 5 is a rear fragmentary view of a barrel type front sight embodying the invention.

Fig. 5 illustrates application of the invention to a "barrel" type front sight wherein the sight device comprises a post member 46 mounting a bead 48 and a hood 49 concentrically of the bead 48. The bead 48 will of course be constructed in accord with the present invention of a suitable luminescent plastic material and will be so shaped as to present from the rear view thereof the form of a bright spot of illumination concisely margined so as to avoid blurred edge effects. Thus, the bead device 48 may comprise a rod of luminescent plastic material partially enclosed within a metal shell as explained hereinabove for optimum support of the plastic substance while permitting light to enter the bar from the front end and/or side portions thereof so that the rear end portion of the bead will appear to be illuminated by brilliantly colored light even under poor lighting conditions as explained hereinabove. Or, if desired such bead member 48 may be completely exposed since the hood 49 provides substantial protection for the bead. Thus, the contrasting appearance of the relatively dark ring 49 of metal and the brilliantly illuminated bead 48 provides an improved "barrel" type front sight arrangement whereby sighting an obscure target may be more quickly effected, and whereby a finer "bead" may be drawn upon the target under even the most adverse lighting conditions and with less strain upon the eyesight of the gunner.

Figure 6:
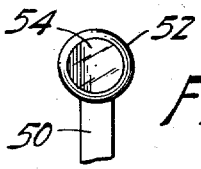
Fig. 6 is a rear view of the front sight of the shotgun type.
Figure 7:
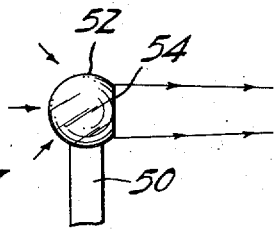
Fig. 7 is a side elevation of the sight of Fig. 6.

Figs. 6–7 illustrate another form of sight device of the invention which is of the so-called "shotgun" type and may be used for either front or front and rear sight purposes. This sight device comprises a post portion 50 which may be formed of metal or plastic or any other suitable material and shaped at its bottom end so as to be either slipfitted or screwed into a receiving socket formed in the gun barrel. In any case the post 50 is topped by a parti-spherical sight bead 52 which is formed of luminescent plastic as explained hereinabove; the rear portion of the sight bead being planed off as indicated at 54 either to a perfectly flat surface or a slightly concave surface facing the line of view of the gunner. Thus, the spherically contoured body portion of the bead 52 functions as a light gathering lens and the plano or plano-concave surface 54 functions as a light projecting medium whereby the gunner sees an intensely brilliant spot of concentrated colored light at the surface 54. It will of course be understood that the surface 54 will be formed of minimum area so that as fine a "bead" as possible may be drawn upon the target; and that in view of the features of the invention as explained hereinabove the sight devices of the invention may be constructed of smaller size than heretofore while nevertheless providing more readily visible beads whereby a gun equipped with a sight of the invention may be quickly aimed even under adverse lighting conditions.

It will be appreciated that the invention is applicable to any gun sight device wherein a sighting bead is used, and that although only a few forms of the sight device of the invention have been shown and described in detail, it will be apparent to those skilled in the art that the invention is not so limited but that various changes may be made therein without departing from the spirit of the invention or the scope of the appended claims.

I claim:

1. A front sight for firearms comprising a support having an eye shaped strap-like holding element extending from said support and a rod shaped bead formed of luminescent plastic adapted to pipe light, said bead being formed at one end with an exposed spherically shaped light gathering surface portion disposed outside of said holding element and at its other end with an exposed plane shaped light emitting surface, said bead being encircled by said holding element and held thereby relative to said support.

2. A front sight for firearms comprising a support having an eye shaped strap-like holding element extending from said support and a cylindrically shaped bead formed of luminescent plastic adapted to pipe light, said bead being encircled by said holding element and held thereby relative to said support, said holding element being dimensioned to terminate short of the opposite ends of said bead thereby exposing the end portions of said bead.

3. A front sight for firearms comprising a support having an eye shaped strap-like holding element extending from said support and a bead in the form of an elongated body of circular cross section comprising luminescent plastic adapted to pipe light, said bead being formed at one end with an exposed spherically shaped light gathering surface disposed outside of said holding element and at its other end with an exposed light emitting surface, said bead being encircled by said holding element and held thereby relative to said support, said holding element being apertured intermediately of its ends to expose side portions of said bead to external light.

4. A front sight for firearms comprising a support having a strap-like holding element extending from said support and a bead formed of luminescent plastic adapted to pipe light, said bead being formed at one end with an exposed light gathering surface and at its other end with an exposed light emitting surface, said bead being encircled by said holding element and held thereby relative to said support, said holding element being apertured intermediately of its ends to expose the side of said bead to external light and terminating short of the ends of said bead whereby the light gathering and light emitting surfaces of said bead are exposed and disposed outside of said holding element.

5. A sight comprising a base member adapted to be mounted on a gun barrel, a neck member extending upwardly from said base member, a sight member integral with said neck member and having a longitudinal cut-out portion extending adjacent the ends of said sight member forming a window through which light rays may enter, and a solid substantially exposed section of luminescent material secured to said sight member and disposed within said cut-out portion.

6. A front sight for firearms comprising a support having a strap-like holding element extending from said support and a bead formed of luminescent plastic adapted to pipe light, said bead being formed at one end with an exposed light gathering surface and at its other end with an exposed light emitting surface, said bead being encircled by said holding element and held thereby relative to said support, said holding element being apertured intermediately of its ends to expose the side of said bead to external light.

*7. A sight comprising a base suitable for attachment to a gun barrel, a bead holding means extending upwardly from the base and having its top portion apertured longitudinally, the holding means having gripping portions spaced lengthwise of the sight, a luminescent plastic bead of elongate form mounted within the apertured portions of said holding means, the gripping portions extending inwardly and over upper surface portions of said bead in longitudinally spaced relationship between exposed portions of the bead and bearing downwardly in holding relation thereagainst, the holding means being so shaped that a substantially greater area of the plastic bead is exposed than is covered by said holding means.*

References Cited in the file of this patent or the original patent

UNITED STATES PATENTS

| | | |
|---|---|---|
| 355,121 | Bennett | Dec. 28, 1886 |
| 572,494 | Veon | Dec. 1, 1896 |
| 830,868 | Watson | Sept. 11, 1906 |
| 908,198 | Bigelow et al. | Dec. 29, 1908 |
| 1,307,646 | Watson | June 24, 1919 |
| 1,346,303 | Dawson et al. | July 13, 1920 |
| 1,433,422 | Spencer | Oct. 24, 1922 |
| 1,851,189 | King | Mar. 29, 1932 |
| 2,181,081 | Ganaway | Nov. 21, 1939 |
| 2,331,400 | Kelsey | Oct. 12, 1943 |
| 2,339,723 | Russell | Jan. 18, 1944 |
| 2,358,867 | Madan | Sept. 26, 1944 |
| 2,376,448 | Neugass | May 22, 1945 |
| 2,430,469 | Karnes | Nov. 11, 1947 |
| 2,488,541 | Holme | Nov. 22, 1949 |
| 2,553,540 | Beckerman | May 22, 1951 |

FOREIGN PATENTS

| | | |
|---|---|---|
| 311,008 | Germany | Feb. 19, 1919 |
| 536,887 | Great Britain | May 30, 1941 |